US012785263B2

(12) United States Patent
Choi et al.

(10) Patent No.: US 12,785,263 B2
(45) Date of Patent: Nov. 3, 2026

(54) ANTENNA SUBSTRATE AND METHOD OF MANUFACTURING THE SAME

(71) Applicant: SAMSUNG ELECTRO-MECHANICS CO., LTD., Suwon-si (KR)

(72) Inventors: Jaewoong Choi, Suwon-si (KR); Haekyo Seo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 162 days.

(21) Appl. No.: 18/443,737

(22) Filed: Feb. 16, 2024

(65) Prior Publication Data

US 2025/0079718 A1 Mar. 6, 2025

(30) Foreign Application Priority Data

Sep. 6, 2023 (KR) ........................ 10-2023-0118355

(51) Int. Cl.
*H01Q 1/52* (2006.01)
*H01Q 1/22* (2006.01)

(52) U.S. Cl.
CPC ........... *H01Q 1/526* (2013.01); *H01Q 1/2283* (2013.01)

(58) Field of Classification Search
CPC .......... H01Q 1/02; H01Q 1/2283; H01Q 1/40; H01Q 1/526; H01Q 19/06; H01Q 21/065
See application file for complete search history.

(56) References Cited

U.S. PATENT DOCUMENTS

| | | | |
|---|---|---|---|
| 10,580,745 B1 * | 3/2020 | Wieland ................ | H10W 44/20 |
| 2016/0020648 A1 | 1/2016 | Contopanagos | |
| 2020/0052405 A1 | 2/2020 | Park et al. | |
| 2020/0259269 A1 * | 8/2020 | Kim ....................... | H01Q 1/521 |

FOREIGN PATENT DOCUMENTS

| | | | |
|---|---|---|---|
| JP | 2013-532436 | A | 8/2013 |
| KR | 10-2018-0119347 | A | 11/2018 |
| WO | 2011/159262 | A1 | 12/2011 |

* cited by examiner

*Primary Examiner* — Daniel Munoz
(74) *Attorney, Agent, or Firm* — Morgan, Lewis & Bockius LLP

(57) ABSTRACT

An antenna substrate according to an embodiment of the present disclosure includes an antenna including an antenna pattern configured to transmit or receive an RF signal, and a directionality adjustment pattern including a plurality of metal layers having a preset area and disposed to be spaced apart from one another, the directionality adjustment pattern being disposed on one surface of the antenna, through which the RF signal emitted from the antenna pattern propagates, and provided such that at least one of the plurality of metal layers has a larger height than each of the remaining metal layers.

19 Claims, 14 Drawing Sheets

1

9

ANTENNA SUBSTRATE AND METHOD OF MANUFACTURING THE SAME

CROSS-REFERENCE TO RELATED APPLICATION

This application claims priority to and the benefit of Korean Patent Application No. 10-2023-0118355 filed in the Korean Intellectual Property Office on Sep. 6, 2023, the entire contents of which are incorporated herein by reference.

TECHNICAL FIELD

The present disclosure relates to an antenna substrate and a method of manufacturing the same.

BACKGROUND

Recently, studies have been actively conducted on millimeter-wave (mmWave) communication including fifth-generation (5G) communication, and studies have also been actively conducted on commercialization of antenna modules that smoothly implement the millimeter-wave communication.

Traditionally, the antenna module, which provides the millimeter-wave communication environment has a structure in which an IC and an antenna are disposed on the module and connected by a coaxial cable in order to satisfy a high-level antenna performance according to a high frequency.

However, this structure may cause a lack of a space for disposing the antenna, a limitation in degree of shape freedom of the antenna, an increase in interference between the antenna and the IC, and an increase in sizes and/or costs of the antenna module.

SUMMARY

The present disclosure attempts to provide an antenna substrate and a method of manufacturing the same, which are capable of adjusting directionality of emitted beams.

An antenna substrate according to an embodiment of the present disclosure may include an antenna including an antenna pattern configured to transmit or receive an RF signal, and a directionality adjustment pattern including a plurality of metal layers having a preset area and disposed to be spaced apart from one another, the directionality adjustment pattern being disposed on one surface of the antenna, and provided such that at least one of the plurality of metal layers has a larger height than each of the remaining metal layers.

The directionality adjustment pattern may be disposed to face the antenna pattern in a thickness direction of the antenna.

The antenna substrate may further include a wiring structure having one surface on which the antenna is disposed, in which the antenna is a chip-type antenna.

The antenna substrate may further include an encapsulation material disposed on the one surface of the wiring structure and configured to surround at least a part of the antenna.

The antenna substrate may further include a shield layer having insulation properties and disposed between the directionality adjustment pattern and the antenna pattern.

The shield layer may be disposed to cover at least a partial region of the antenna pattern.

The shield layer may be provided on the antenna pattern and disposed on at least a partial region of the encapsulation material adjacent to the antenna pattern.

The antenna substrate may further include a wiring structure having one surface on which the antenna is disposed, in which the antenna may further include: a dielectric layer configured to surround the antenna pattern; and a through-via connected to the antenna pattern, penetrating through the dielectric layer, and extending in a direction in which the wiring structure is disposed.

The antenna may further include a director member disposed between the directionality adjustment pattern and the antenna pattern.

The antenna substrate may further include a shield layer having insulation properties and disposed between the directionality adjustment pattern and the director member.

The shield layer may be disposed to cover at least a partial region of the director member.

The shield layer may be provided on the director member and disposed on at least a partial region of the dielectric layer adjacent to the director member.

The antenna pattern may be provided as a plurality of antenna patterns disposed to be spaced apart from one another on a plane intersecting a thickness direction of the antenna.

The directionality adjustment pattern may be provided as a metamaterial structure.

The RF signal emitted from the antenna pattern may be configured to propagate through the directionality adjustment pattern.

A height of the plurality of metal layers may increase from an edge region of the directionality adjustment pattern to a center region of the directionality adjustment pattern.

Another embodiment of the present disclosure provides an antenna substrate including: an antenna including an antenna pattern configured to transmit or receive an RF signal; and a directionality adjustment pattern including a plurality of metal layers having a preset area and disposed to be spaced apart from one another, the directionality adjustment pattern being disposed on one surface of the antenna. The directionality adjustment pattern includes: a first pattern region disposed at a first distance from a central region of the directionality adjustment pattern; and a second pattern region disposed at a second distance, which is longer than the first distance, from the central region of the directionality adjustment pattern. One of the first and second pattern regions has a larger height than another of the first and second pattern regions.

The plurality of metal layers of the first pattern region may have different heights in an upward/downward direction.

The plurality of metal layers of the second pattern region may have different heights in an upward/downward direction.

Still another embodiment of the present disclosure provides a method of manufacturing an antenna substrate, the method including: forming a first mask on a shield layer of an antenna having an antenna pattern configured to transmit or receive an RF signal; forming a first metal layer on the shield layer by using the first mask; forming a second mask on the first mask so that the second mask covers a part of the first metal layer and the remaining part of the first metal layer is exposed; forming a second metal layer on the first metal layer by using the second mask; and removing the first mask and the second mask and forming a directionality adjustment pattern that provides regions having different heights on the antenna by means of the first metal layer and the second metal layer.

At least one of the embodiments may provide the antenna substrate and the method of manufacturing the same, which are capable of adjusting the directionality of the emitted beams.

DETAILED DESCRIPTION OF THE EMBODIMENTS

Figure 1:
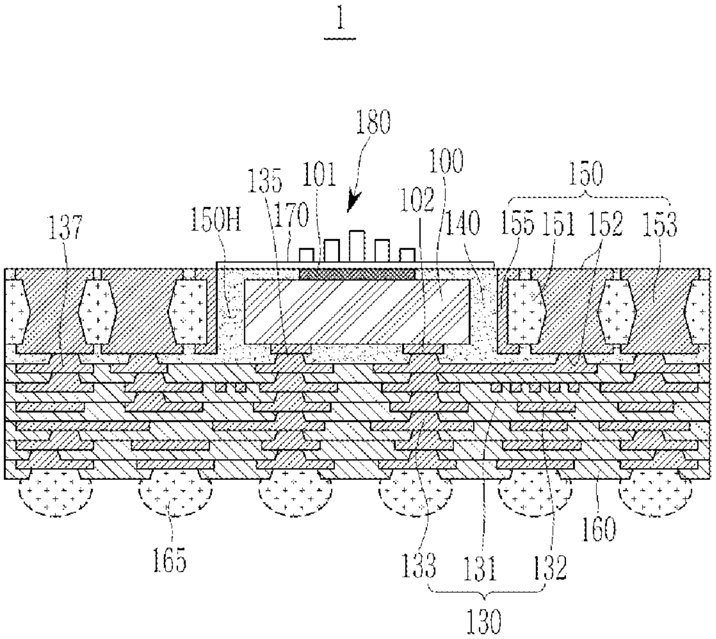
FIG. 1 is a view illustrating an antenna substrate according to the embodiment.

Hereinafter, several exemplary embodiments of the present disclosure will be described in detail with reference to the accompanying drawings so that those with ordinary skill in the art to which the present disclosure pertains may easily carry out the exemplary embodiments. The present disclosure may be implemented in various different ways and is not limited to the embodiments described herein.

A part irrelevant to the description will be omitted to clearly describe the present disclosure, and the same or similar constituent elements will be designated by the same reference numerals throughout the specification.

In addition, a size and thickness of each constituent element illustrated in the drawings are arbitrarily shown for convenience of description, but the present disclosure is not limited thereto. In order to clearly describe several layers and regions, thicknesses thereof are enlarged in the drawings. In the drawings, the thicknesses of some layers and regions are exaggerated for convenience of description.

In addition, when one component such as a layer, a film, an area, or a plate is described as being positioned "above" or "on" another component, one component can be positioned "directly on" another component, and one component can also be positioned on another component with other components interposed therebetween. On the contrary, when one component is described as being positioned "directly above" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Throughout the specification, unless explicitly described to the contrary, the word "comprise/include" and variations such as "comprises/includes" or "comprising/including" will be understood to imply the inclusion of stated elements, not the exclusion of any other elements.

In addition, throughout the specification, the phrase "in a plan view" means when an object is viewed from above, and the phrase "in a cross-sectional view" means when a cross section made by vertically cutting an object is viewed from a lateral side.

FIG. 1 is a view illustrating an antenna substrate 1 according to an embodiment.

With reference to FIG. 1, the antenna substrate 1 according to the embodiment includes an antenna 100, wiring structures 130, and a directionality adjustment pattern 180.

The antenna 100 may be a chip-type antenna 100. The antenna 100 may include one surface and the other surface facing one surface. FIG. 1 illustrates that one surface of the antenna 100 is directed upward. One surface of the antenna 100 may be referred to as an upper surface of the antenna 100, and the other surface of the antenna 100 may be referred to as a lower surface of the antenna 100. In addition, a direction in which one surface and the other surface face each other may be referred to as a thickness direction of the antenna 100.

A body of the antenna 100 may be made of a dielectric material. In the antenna 100, an antenna pattern 101 may be disposed on an upper surface of the body made of a dielectric material, and pad patterns 102 may be disposed on a lower surface of the body. A single antenna 100 or a plurality of antennas 100 may be provided. For example, the plurality of antennas 100 may be disposed in various shapes such as a 1×2 array, a 1×4 array, or a 2×2 array.

The dielectric body of the antenna 100 may include a material having high permittivity (Dk). For example, the dielectric body may include a ceramic layer and/or a ceramic-polymer composite layer. Alternatively, the dielectric body may include an insulation layer including an insulating material, such as polytetrafluoroethylene (PTFE), having high permittivity (Dk). The ceramic-polymer composite layer may be made by dispersing ceramic fillers into an organic binder. The organic binder may be made of polymer such as PTFE or epoxy. The ceramic filler may be a filler made of $SiO_2$, $TiO_2$, $Al_2O_3$, or the like. A diameter of the ceramic filler may be 50 μm or less. The ceramic-polymer composite layer may include a reinforcing material reinforced with fiberglass.

The antenna pattern 101 and the pad pattern 102 may each include a metallic material. The metallic material may be copper (Cu), aluminum (Al), silver (Ag), tin (Sn), gold (Au), nickel (Ni), lead (Pb), titanium (Ti), or an alloy thereof. The antenna pattern 101 may be a coupling pattern. A patch pattern coupled to the antenna pattern 101 may be disposed in the dielectric body. The antenna pattern 101 may transmit or receive RF signals in a thickness direction.

The pad pattern 102 enables the antenna 100 to be connected to the external component. The pad pattern 102 may connect the antenna 100 to the wiring structure 130. At least one of the pad patterns 102 may be connected to the patch pattern in the dielectric body through a feeding via in the dielectric body. At least one of the pad patterns 102 may be connected to a feeding pattern of the wiring structure 130. At least one of the pad patterns 102 may be connected to a ground of the wiring structure 130.

The antenna 100 may be disposed on one surface of the wiring structure 130. Hereinafter, one surface of the wiring structure 130 is referred to as an upper surface of the wiring structure 130.

The wiring structure 130 includes the insulation layer 131, a wiring layer 132, and a via layer 133. The wiring layer 132 may be disposed on the insulation layer 131. In addition, the wiring layer 132 may be disposed in the insulation layer 131. The insulation layer 131 may be provided as a plurality of insulation layers 131 that define a multilayer structure. The via layers 133 may respectively penetrate the insulation layers 131. The via layer 133, which is disposed at an uppermost side, may penetrate at least a part of an encapsulation material 140.

The insulation layer 131 may include an insulating material. The insulating material may include thermosetting resin, such as epoxy resin, or thermoplastic resin such as polyimide. In addition, the insulating material may include a reinforcing material such as fiberglass (glass fiber, glass cloth, glass fabric) or an inorganic filler. For example, the reinforcing material may be prepreg, an Ajinomoto build-up film (ABF), or the like. In addition, the insulation layer 131 may include a thermoplastic resin layer and a thermosetting resin layer. For example, the insulation layer 131 may include a stack in which thermoplastic resin layer and thermosetting resin layer are alternately stacked. The thermoplastic resin layer may include a material that is effective in transmitting a high-frequency signal. The thermosetting resin layer may include a material that is advantageous in transmitting a high-frequency signal and has excellent bondability. Therefore, the insulation layer 131 may have excellent high-frequency signal transmission characteristics and adhesion.

The thermoplastic resin layer may be made of liquid crystal polymer (LCP), polytetrafluoroethylene (PTFE), polyphenylene sulfide (PPS), polyphenylene ether (PPE), polyimide (PI), or the like. A dielectric loss factor (Df) may be adjusted depending on types of resin types of fillers contained in resin, filler contents, and the like in the thermoplastic resin layer. The thermoplastic resin layer having low dielectric loss characteristics is advantageous in transmitting the high-frequency signal and reducing the loss. The dielectric loss factor (Df) of the thermoplastic resin layer may be 0.003 or less. The thermoplastic resin layer may have low permittivity characteristics. For example, the permittivity (Dk) of the thermoplastic resin layer may be 3.5 or less. The thermosetting resin layer may be made of modified polyimide (PI), polyphenylene ether (PPE), modified epoxy, or the like. The dielectric loss factor (Df) may be adjusted depending on types of resin types of fillers contained in resin, filler contents, and the like in the thermosetting resin layer. The thermosetting resin layer having low dielectric loss characteristics is advantageous in transmitting the high-frequency signal and reducing the loss. The dielectric loss factor (Df) of the thermosetting resin layer may be 0.003 or less. In addition, the permittivity (Dk) of the thermosetting resin layer may be 3.5 or less.

The wiring layer 132 may include a metallic material. The metallic material may be copper (Cu), aluminum (Al), silver (Ag), tin (Sn), gold (Au), nickel (Ni), lead (Pb), titanium (Ti), or an alloy thereof. The wiring layer 132 may be formed by an additive process (AP), a semi-AP (SAP), a modified SAP (MSAP), tenting (TT), or the like. The wiring layer 132 may include a seed layer, which is an electroless plating layer, and an electroplating layer formed based on the seed layer. The wiring layer 132 may further include primer copper foil. The wiring layer 132 may include the feeding pattern connected to the antenna 100. In addition, the wiring layer 132 may include a ground pattern. In addition, the wiring layer 132 may include a power pattern. The wiring layer 132 may include another signal transmission pattern in addition to the feeding pattern. The patterns may each include a line pattern, a plane pattern, and/or a pad pattern.

The via layer 133 may include a metallic material. The metallic material may be copper (Cu), aluminum (Al), silver (Ag), tin (Sn), gold (Au), nickel (Ni), lead (Pb), titanium (Ti), or an alloy thereof. The via layer 133 may be formed by a plating process such as an AP, an SAP, an MSAP, or a TT. The via layer 133 may include a seed layer, which is an electroless plating layer, and an electroplating layer formed based on the seed layer. The via layer 133 may include a connection via for connecting the feeding pattern, a connection via for connecting the ground, a connection via for connecting the power, a connection via for connecting other signals, and the like.

The via layer 133 may include a first connection via 135 and a second connection via 137. The first connection via 135 and the second connection via 137 may each have at least a partial region disposed on the upper surface of the wiring structure 130.

The wiring layer 132, which is disposed at an upper side of the wiring structure 130, may be connected to the antenna 100 through the first connection via 135. The first connection via 135 may be connected to the pad pattern 102 of the antenna 100. The wiring layer 132, which is disposed at the upper side of the wiring structure 130, may be connected to a heat dissipation structure 150, which will be described, through the second connection via 137. The second connection via 137 may be connected to a first metal pattern layer 152 disposed at a lower side of the heat dissipation structure 150.

The first connection via 135 may include a feeding connection via and a ground connection via. The second connection via 137 may include a ground connection via.

The encapsulation material 140 may be disposed on the upper surface of the wiring structure 130. The encapsulation material 140 surrounds at least a part of the antenna 100. The encapsulation material 140 may cover an entire lateral surface of the antenna 100. The encapsulation material 140 may cover at least a part of the lower surface of the antenna 100. The encapsulation material 140 may cover at least a part of the upper surface of the antenna 100. The encapsulation material 140 may be disposed to fill a space defined between the wiring structure 130 and the antenna 100. The encapsulation material 140 may be disposed to fill a space defined between the wiring structure 130 and the heat dissipation structure 150.

The encapsulation material 140 may include an insulating material. The insulating material may include thermosetting resin, such as epoxy resin, or thermoplastic resin such as polyimide. In addition, the insulating material may include a reinforcing material such as an inorganic filler. For example, the reinforcing material may be ABF or the like.

The heat dissipation structure 150 may be disposed at an outer periphery of the antenna 100. That is, a through-hole 150H may be formed in a central region of the heat dissipation structure 150, and the antenna 100 may be disposed in the through-hole 150H. The heat dissipation structure 150 is disposed on the upper surface of the wiring structure 130.

The heat dissipation structure 150 effectively discharges heat generated from the antenna 100. In addition, the heat dissipation structure 150 may improve rigidity of the antenna substrate 1. In addition, the heat dissipation structure 150 may improve thickness uniformity of the encapsulation material 140.

The heat dissipation structure 150 may include an insulation substrate 151, the first metal pattern layer 152, and a second metal pattern layer 155.

The insulation substrate 151 has a preset thickness and is disposed at the outer periphery of the antenna 100. The through-hole 150H may be formed in the central region of the insulation substrate 151. The antenna 100 is disposed in the through-hole 150H.

The insulation substrate 151 may include an insulating material. The insulating materials may include fiberglass, reinforcing materials, insulating materials of copper-clad laminates (CCLs), prepreg, or the like. In addition, the insulating material may include glass, ceramic, plastic, or the like.

The first metal pattern layers 152 are respectively disposed on the upper and lower surfaces of the insulation substrate 151. The first metal pattern layers 152, which are respectively disposed on the upper and lower surfaces of the insulation substrate 151, may be connected to each other by a metal via layer 153 that penetrates the insulation substrate 151. The first metal pattern layer 152 may further include primer copper foil. The first metal pattern layer 152 may include a ground pattern.

The second metal pattern layer 155 is disposed on an inner surface of the insulation substrate 151. That is, the second metal pattern layer 155 may be disposed on a wall surface of the through-hole 150H. The second metal pattern layer 155 may further include primer copper foil. The second metal pattern layer 155 may include a ground pattern.

The first metal pattern layer 152, the metal via layer 133, and the second metal pattern layer 155 may each include a metallic material. The metallic material may be copper (Cu), aluminum (Al), silver (Ag), tin (Sn), gold (Au), nickel (Ni), lead (Pb), titanium (Ti), or an alloy thereof. The first metal pattern layer 152, the metal via layer 133, and the second metal pattern layer 155 may each be formed by an AP, an SAP, an MSAP, or a TT. The first metal pattern layer 152, the metal via layer 133, and the second metal pattern layer 155 may each include a seed layer, which is an electroless plating layer, and an electroplating layer formed based on the seed layer.

A passivation layer 160 may be disposed on the lower surface of the wiring structure 130. The passivation layer 160 may cover at least a part of the wiring layer 132 disposed at the lower end of the wiring structure 130. The passivation layer 160 may have an opening through which a part of the wiring layer 132 disposed at the lower end of the wiring structure 130 is exposed.

The passivation layer 160 may include an insulating material. The insulating material may be a material including thermosetting resin such as epoxy resin, thermoplastic resin such as polyimide, or a reinforcing material such as an inorganic filler together with thermosetting resin and thermoplastic resin. For example, the insulating material may be ABF or the like. In addition, the insulating material may be a solder resist (SR) including a photosensitive material.

A connection terminal 165 may be disposed in the opening of the passivation layer 160. The connection terminal 165 may be connected to the wiring layer 132 disposed at the lower end of the wiring structure 130. The connection terminal 165 provides a route through which the antenna substrate 1 is connected to an external constituent element. The connection terminal 165 may be made of low-melting point metal having a lower melting point than copper (Cu). For example, the connection terminal 165 may be made of tin (Sn) or an alloy including tin (Sn). For example, the connection terminal 165 may be solder or the like. The connection terminal 165 may be a land, a ball, a pin, or the like. In addition, the connection terminal 165 may include a copper pillar and solder.

Figure 2:
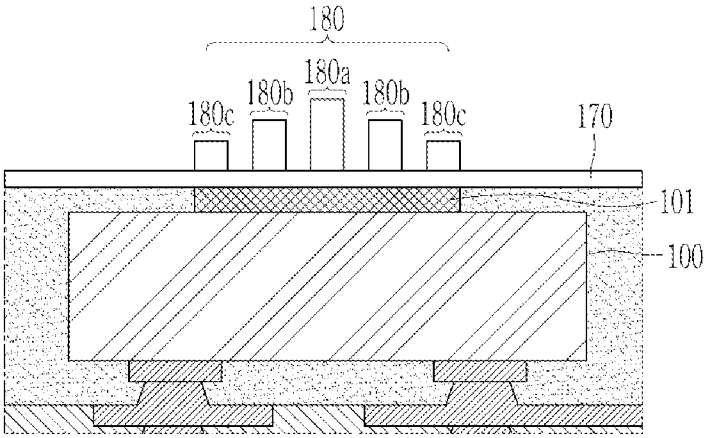
FIG. 2 is a view illustrating a region of the antenna substrate in FIG. 1 in which an antenna is disposed.

FIG. 2 is a view illustrating a region of the antenna substrate 1 in FIG. 1 in which the antenna 100 is disposed.

With reference to FIG. 2, a shield layer 170 may be disposed on the antenna pattern 101. The shield layer 170 is disposed to cover at least a partial region of the antenna pattern 101. The shield layer 170 may be disposed as a structure that covers the entire antenna pattern 101. The shield layer 170 may be provided on the antenna pattern 101 and disposed on at least a partial region of the encapsulation material 140 adjacent to the antenna pattern 101. The shield layer 170 is provided to have insulation properties. The shield layer 170 may include an insulating material. The insulating material may include thermosetting resin, such as epoxy resin, or thermoplastic resin such as polyimide. In addition, the insulating material may include a reinforcing material such as an inorganic filler. For example, the reinforcing material may be ABF or the like. In addition, the shield layer 170 may be made of a photo imageable encapsulant (PIE), an epoxy molding compound (EMC), or the like. The shield layer 170 may be made of the same material as the encapsulation material 140.

The directionality adjustment pattern 180 is disposed on one surface of the antenna 100. The directionality adjustment pattern 180 is disposed in a direction in which the RF signal emitted from the antenna pattern 101 propagates. The directionality adjustment pattern 180 may be disposed to face the antenna pattern 101 in the thickness direction of the antenna 100. The shield layer 170 may be disposed between the directionality adjustment pattern 180 and the antenna pattern 101. The directionality adjustment pattern 180 may be disposed to face the antenna pattern 101 with the shield layer 170 interposed therebetween. The directionality adjustment pattern 180 may be disposed on the shield layer 170. The directionality adjustment pattern 180 may be made of a metallic material. For example, the directionality adjustment pattern 180 may be made of copper or the like. The directionality adjustment pattern 180 adjusts directionality and directions of beams generated by the RF signal emitted from the antenna pattern 101. The directionality adjustment pattern 180 provides regions having different heights in an upward/downward direction. The directionality adjustment pattern 180 includes a plurality of metal layers disposed to be spaced apart from one another and has a preset area. In this case, a width of each of the plurality of metal layers, which is based on one direction among directions intersecting the upward/downward direction, may be smaller than a wavelength of the RF signal. An area of the directionality adjustment pattern 180 may correspond to an area of the antenna pattern 101. At least one of the plurality of metal layers of the directionality adjustment pattern 180 has a larger height than the remaining metal layers of the directionality adjustment pattern 180. That is, a height, in the upward/downward direction, of the region of the directionality adjustment pattern 180, which is provided to improve the directionality of the beams emitted from the antenna pattern 101, may be larger than a height of each of the remaining regions.

The directionality adjustment pattern 180 may include a first pattern region 180*a*, second pattern regions 180*b*, and third pattern regions 180*c*.

The first pattern region 180*a* may be disposed at a first distance from the central region of the directionality adjustment pattern 180. For example, the first pattern region 180*a* may be disposed in the center region of the antenna pattern 101.

The second pattern region 180*b* may be disposed at a second distance, which is longer than the first distance, from the central region of the directionality adjustment pattern 180. For example, the second pattern region 180*b* may be disposed in a middle region of the antenna pattern 101. The middle region of the antenna pattern 101 is disposed between the center region and an edge region of the antenna pattern 101. The second pattern region 180*b* may be disposed at an outer periphery of the first pattern region 180*a*. The second pattern region 180*b* may be disposed to be spaced apart from the first pattern region 180*a*.

The third pattern region 180*c* may be disposed at a third distance, which is longer than the second distance, from the central region of the directionality adjustment pattern 180. For example, the third pattern region 180*c* may be disposed in the edge region of the antenna pattern 101. The third pattern region 180*c* may be disposed at an outer periphery of the second pattern region 180*b*. The third pattern region 180*c* may be disposed to be spaced apart from the second pattern region 180*b*.

The first pattern region 180*a* may be provided to be larger in height in the upward/downward direction than the second pattern region 180*b* and the third pattern region 180*c*. In addition, the second pattern region 180*b* may be provided to be larger in height in the upward/downward direction than the third pattern region 180*c*. That is, a portion of the directionality adjustment pattern 180, which is disposed in the center region of the antenna pattern 101, is provided to be larger in height than the remaining portions. Therefore, the beams emitted from the antenna pattern 101 are concentrated on the center region of the antenna pattern 101.

As described above, in the directionality adjustment pattern 180, one of the first pattern region 180*a*, the second pattern region 180*b*, and the third pattern region 180*c* may have a larger height than the others of the first pattern region 180*a*, the second pattern region 180*b*, and the third pattern region 180*c*.

In addition, the directionality adjustment pattern 180 provides the regions having different heights in the upward/downward direction based on a plane intersecting the thickness direction of the antenna 100. That is, the first pattern region 180*a* may provide regions having a plurality of metal layers having different heights in the upward/downward direction. The second pattern region 180*b* may provide regions having a plurality of metal layers having different heights in the upward/downward direction in a circumferential direction around the center of the directionality adjustment pattern 180. In addition, the third pattern region 180*c* may provide regions having a plurality of metal layers having different heights in the upward/downward direction in a circumferential direction around the center of the directionality adjustment pattern 180.

The directionality adjustment pattern 180 may have a metamaterial structure. Therefore, the directionality adjustment pattern 180 may more effectively adjust the directionality of the beams emitted from the antenna pattern 101.

FIGS. 3 to 8 are views illustrating a process of manufacturing the directionality adjustment pattern 180.

Hereinafter, a method of manufacturing the directionality adjustment pattern 180 will be described with reference to FIGS. 3 to 8.

Figure 3:
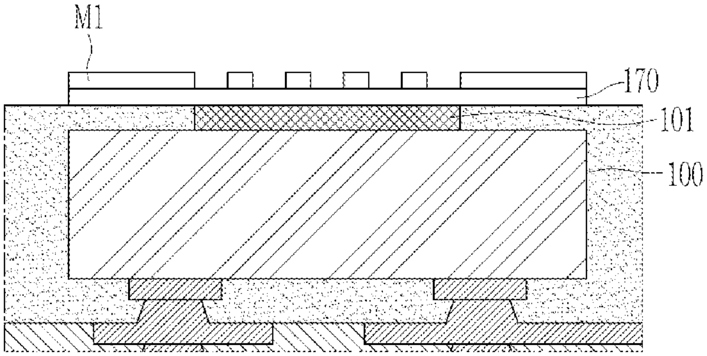
FIGS. 3 to 8 are views illustrating a process of manufacturing a directionality adjustment pattern.

With reference to FIG. 3, a first mask M1 is formed on the shield layer 170. The first mask M1 is formed in a region disposed to face the antenna pattern 101 with the shield layer 170 interposed therebetween. The first mask M1, and second and third masks M2 and M3 to be described later, may be formed by means of photolithography using a dry film, a photoresist, or the like. The first mask M1 may be formed such that the shield layer 170 is exposed to the entire region in which the directionality adjustment pattern 180 is to be formed.

Figure 4:
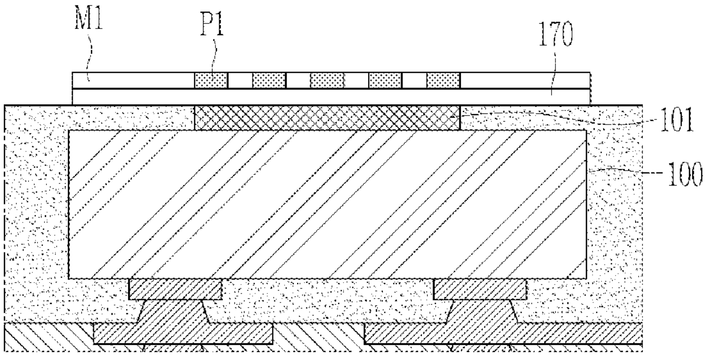

With reference to FIG. 4, a first metal layer P1 forforming the directionality adjustment pattern 180 is formed on the shield layer 170 by using the first mask M1. The first metal layer P1 may be formed by a plating process, a deposition process, or the like.

Figure 5:
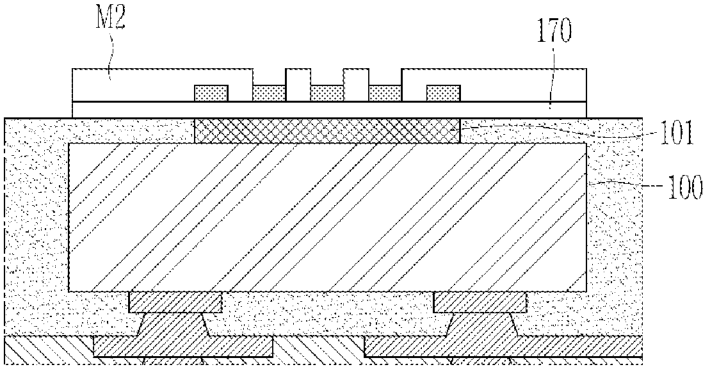

With reference to FIG. 5, a second mask M2 is additionally formed on the first mask M1. The second mask M2 is formed in the region in which the first mask M1 is formed. The second mask M2 extends in a direction opposite to the antenna pattern 101. The second mask M2 is formed such that the second mask M2 covers a part of the previously formed first metal layer P1 and the remaining part of the first metal layer P1 is exposed. For example, the second mask M2 is formed such that the second mask M2 covers the first metal layer P1 formed in the edge region of the antenna pattern 101 and the first metal layer P1 formed in the middle and center regions of the antenna pattern 101 is exposed.

Figure 6:
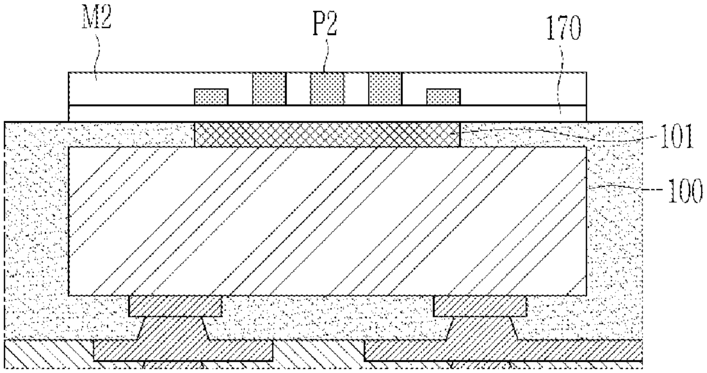

With reference to FIG. 6, a second metal layer P2 is formed on the first metal layer P1 by using the second mask M2. Because the second mask M2 covers a part of the previously formed first metal layer P1, the second metal layer P2 may be formed on the remaining part of the first metal layer P1. For example, the second metal layer P2 may be formed on the first metal layer P1 formed in the middle and center regions of the antenna pattern 101. The second metal layer P2 may be formed by a plating process, a deposition process, or the like.

Figure 7:
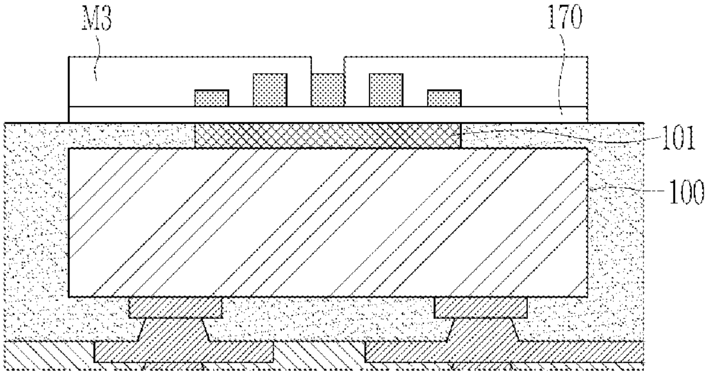

With reference to FIG. 7, a third mask M3 is additionally formed on the second mask M2. The third mask M3 is formed in the region in which the second mask M2 is formed. The third mask M3 extends in a direction opposite to the antenna pattern 101. The third mask M3 is formed such that the third mask M3 covers the previously formed second metal layer P2 and the remaining part of the second metal layer P2 is exposed. For example, the third mask M3 may be formed such that the third mask M3 covers the second metal layer P2 formed in the middle region of the antenna pattern 101 and the second metal layer P2 formed in the center region of the antenna pattern 101 is exposed.

Figure 8:
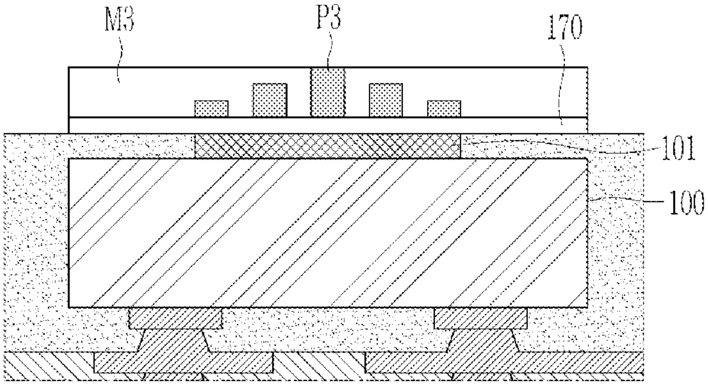

With reference to FIG. 8, a third metal layer P3 is formed on the second metal layer P2 by using the third mask M3. Because the third mask M3 covers the previously formed second metal layer P2, the third metal layer P3 is formed on the remaining part of the second metal layer P2. For example, the third metal layer P3 may be formed on the second metal layer P2 formed in the center region of the antenna pattern 101. The third metal layer P3 may be formed by a plating process, a deposition process, or the like.

Thereafter, when the first mask M1, the second mask M2, and the third mask M3 are removed, the first metal layer P1, the second metal layer P2, and the third metal layer P3 define the directionality adjustment pattern 180.

Figure 9:
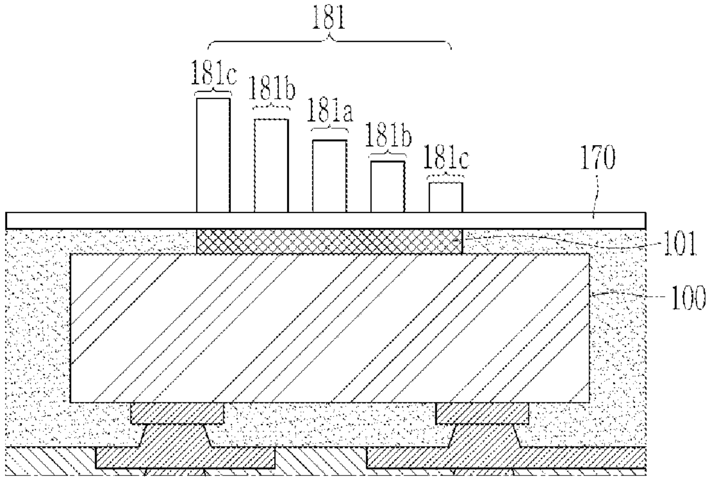
FIG. 9 is a view illustrating a directionality adjustment pattern according to another embodiment.

FIG. 9 is a view illustrating a directionality adjustment pattern 181 according to another embodiment.

With reference to FIG. 9, the directionality adjustment pattern 181 may be provided such that heights in the upward/downward direction increase from one end of the edge region toward the other end of the edge region.

For example, the directionality adjustment pattern 181 may include a first pattern region 181*a*, second pattern regions 181*b*, and third pattern regions 181*c*.

At least a partial region of the first pattern region 181*a* may be disposed in the center region of the antenna pattern 101.

The second pattern regions 181*b* are respectively disposed at two opposite sides of the first pattern region 181*a*. At least a partial region of the second pattern region 181*b* may be disposed in the middle region of the antenna pattern 101.

The second pattern regions 181*b*, which face each other with the first pattern region 181*a* interposed therebetween, may have different heights in the upward/downward direction. The second pattern region 181*b*, which is disposed in one direction of the first pattern region 181*a*, may have a larger height than the first pattern region 181*a*. The second pattern region 181*b*, which is disposed in the other direction of the first pattern region 181*a*, may have a smaller height than the first pattern region 181*a*.

The third pattern regions 181*c* are disposed to be opposite to the first pattern region 181*a* with the second pattern regions 181*b* interposed therebetween. The third pattern region 181*c* may be disposed in the edge region of the antenna pattern 101. The third pattern region 181*c*, which is disposed in one direction of the first pattern region 181*a*, may have a larger height than the second pattern region 181*b* adjacent to the third pattern region 181*c*. The third pattern region 181*c*, which is disposed in the other direction of the first pattern region 181*a*, may have a smaller height than the second pattern region 181*b* adjacent to the third pattern region 181*c*.

Figure 10:
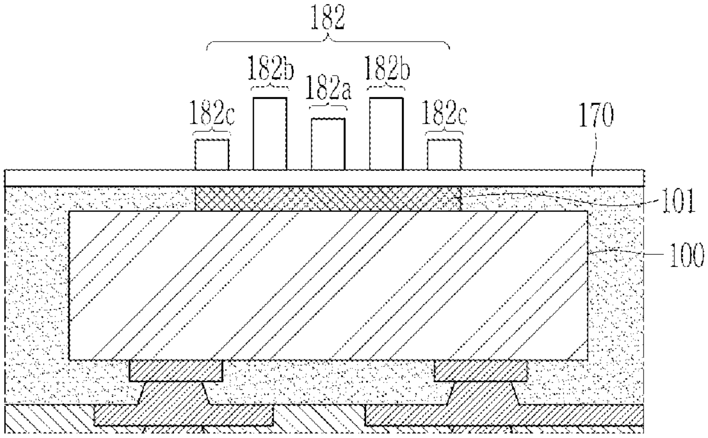
FIG. 10 is a view illustrating a directionality adjustment pattern according to still another embodiment.

FIG. 10 is a view illustrating a directionality adjustment pattern 182 according to still another embodiment.

With reference to FIG. 10, the directionality adjustment pattern 182 may be provided such that a height of a middle region is larger than a height of each of center and edge regions.

For example, the directionality adjustment pattern 182 may include a first pattern region 182*a*, second pattern regions 182*b*, and third pattern regions 182*c*.

At least a partial region of the first pattern region 182*a* may be disposed in the center region of the antenna pattern 101.

The second pattern regions 182*b* are respectively disposed at two opposite sides of the first pattern region 182*a*. At least a partial region of the second pattern region 182*b* may be disposed in the middle region of the antenna pattern 101. The second pattern region 182*b* may have a larger height than the first pattern region 182*a*.

The third pattern regions 182*c* are disposed to be opposite to the first pattern region 182*a* with the second pattern regions 182*b* interposed therebetween. The third pattern region 182*c* may be disposed in the edge region of the antenna pattern 101. The third pattern region 182*c* may have a smaller height than the second pattern region 182*b*. In one example, the third pattern region 182*c* may have a smaller height than the first pattern region 182*a*.

Figure 11:
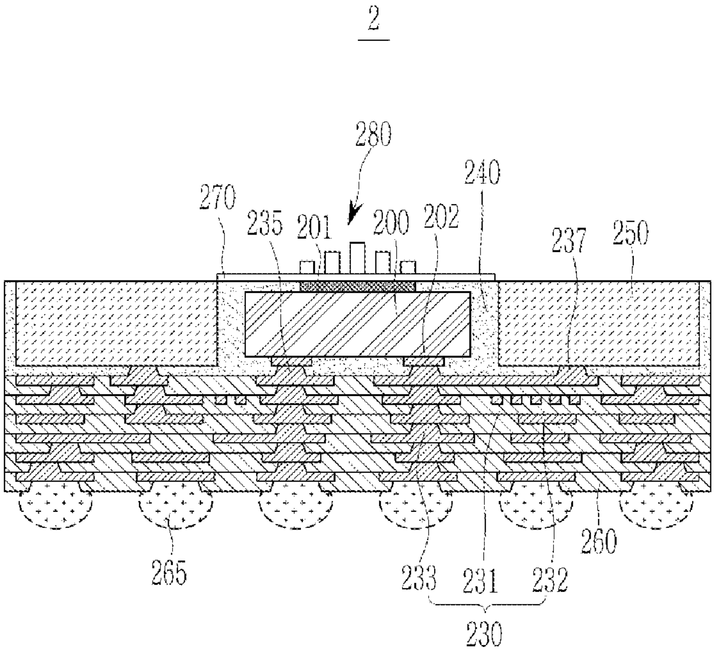
FIG. 11 is a view illustrating an antenna substrate according to another embodiment.

FIG. 11 is a view illustrating an antenna substrate 2 according to another embodiment.

With reference to FIG. 11, the antenna substrate 2 according to another embodiment includes an antenna 200, wiring structures 230, a heat dissipation structure 250, and a directionality adjustment pattern 280.

The heat dissipation structure 250 may be provided as a conductor block. The heat dissipation structure 250 may be made of a metallic material. For example, the heat dissipation structure 250 may include copper (Cu) or the like.

The heat dissipation structure 250 is disposed on the upper surface of the wiring structure 230. The heat dissipation structure 250 may be disposed at an outer periphery of the antenna 200. At least a partial region of the heat dissipation structure 250 may be covered by an encapsulation material 240.

The antenna 200 includes an antenna pattern 201, and pad patterns 202.

The wiring structure 230 includes an insulation layer 231, a wiring layer 232, and a via layer 233. A first connection via 235 may be connected to the antenna 200. A second connection via 237 may be connected to the heat dissipation structure 250. The encapsulation material 240 may be disposed on an upper surface of the wiring structure 230. The encapsulation material 240 covers at least a part of the antenna 200.

A passivation layer 260 may be disposed on a lower surface of the wiring structure 230. A connection terminal 265 may be disposed in an opening of the passivation layer 260.

Because the antenna 200 and the wiring structure 230 are identical or similar in structures to the antenna 100 and the wiring structure 130 described above with reference to FIG. 1, a repeated description thereof will be omitted.

The directionality adjustment pattern 280 is disposed on the antenna pattern 201. A shield layer 270 may be disposed between the directionality adjustment pattern 280 and the antenna pattern 201. The directionality adjustment pattern 280 and the shield layer 270 are identical or similar to the directionality adjustment patterns 180, 181, and 182 and the shield layer 170 described above with reference to FIGS. 1, 9, and 10, a repeated description thereof will be omitted.

Figure 12:
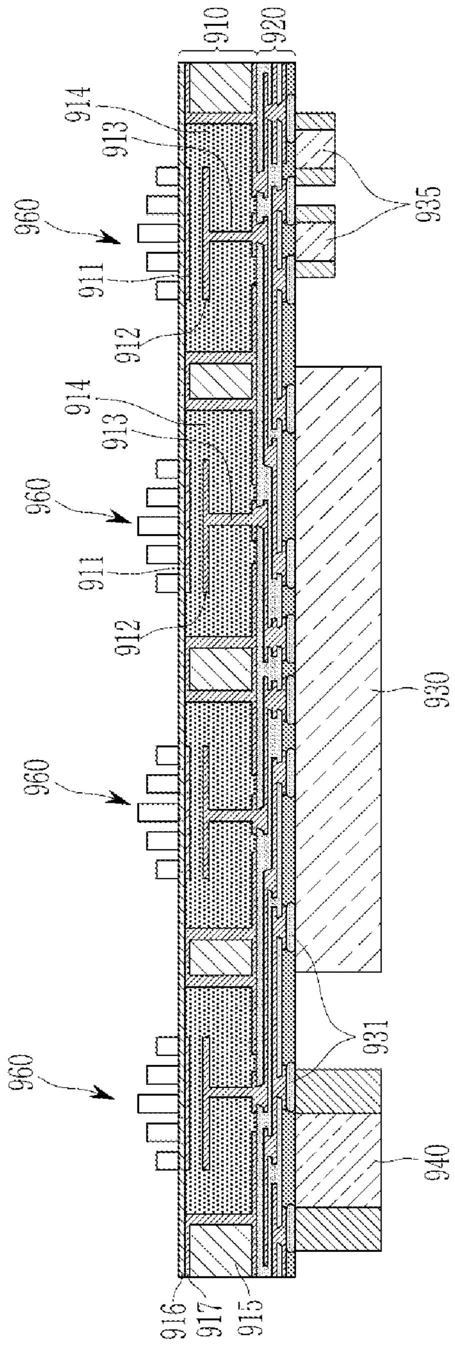
FIG. 12 is a view illustrating an antenna substrate according to still another embodiment.

FIG. 12 is a view illustrating an antenna substrate 9 according to still another embodiment.

With reference to FIG. 12, the antenna substrate 9 according to still another embodiment includes antennas 910, wiring structures 920, and directionality adjustment patterns 960.

The antenna 910 may include one surface and the other surface facing one surface. FIG. 12 illustrates that one surface of the antenna 910 is directed upward. One surface of the antenna 910 may be referred to as an upper surface of the antenna 910, and the other surface of the antenna 910 may be referred to as a lower surface of the antenna 910. In addition, a direction in which one surface and the other surface face each other may be referred to as a thickness direction of the antenna 910.

The antenna 910 includes a director member 911, an antenna pattern 912, and a dielectric layer 914.

The director member 911 may be disposed adjacent to one surface of the antenna 910. The director member 911, together with the antenna pattern 912 matched with the director member 911, may receive an RF signal or transmit an RF signal. The plurality of director members 911 may be arranged to be spaced apart from one another on a plane intersecting the thickness direction of the antenna 910. The director member 911 may be excluded in accordance with design. In addition, the plurality of director members 911 may be spaced apart from one another in the thickness direction of the antenna 910 and arranged to define a multilayer structure.

The antenna pattern 912 is disposed to be spaced apart from the director member 911 toward the other surface of the antenna 910.

The antenna pattern 912 may be electromagnetically connected to the director member 911 matched with the antenna pattern 912 and receive or transmit the RF signals together with the corresponding director member 911. The plurality of antenna patterns 912 may be arranged to be spaced apart from one another on a plane intersecting the thickness direction of the antenna 910. The antenna patterns 912 may be matched with the director members 911 in a one-to-one manner. The antenna pattern 912 may have a shape corresponding to a shape of the director member 911 matched with the antenna pattern 912.

A through-via 913 may be electrically connected to the antenna pattern 912. The through-via 913 may provide a route for an RF signal.

The dielectric layer 914 is disposed to surround the antenna pattern 912. That is, the antenna pattern 912 may be understood as being disposed to be embedded in the dielectric layer 914. Further, the through-via 913 may be formed through the dielectric layer 914 and extend toward the other surface of the antenna 910. The dielectric layer 914 has a preset thickness. A boundary condition for the RF signal transmitting or receiving operation of the antenna pattern 912 may be adjusted depending on a length of the through-via 913 and a thickness of the dielectric layer 914.

Insulation members 915 may be respectively disposed on the antenna patterns 912 and outer peripheries of the dielectric layers 914 that surround the antenna patterns 912. In this case, the dielectric layer 914 may be provided to have a dielectric constant larger than a dielectric constant (Dk) of the insulation member 915. For example, the dielectric layer 914 may be made of glass, ceramic, silicon, quartz, Teflon, or the like. Therefore, the performance of the antenna pattern 912 of the antenna 910 may be improved. The insulation member 915 may have a thickness corresponding to the dielectric layer 914. The insulation member 915 may be provided as a copper clad laminate (CCL), prepreg, or the like.

A plating layer 917 may be formed on an outer surface of the insulation member 915. Therefore, the plating layer 917 may be disposed between the dielectric layer 914 and the insulation member 915. In addition, the plating layer 917 may be disposed on an upper surface of the insulation member 915. The plating layer 917 may provide a boundary condition advantageous for the RF signal transmitting or receiving operation of the antenna pattern 912.

A shield layer 916 may be disposed on the director member 911. The shield layer 916 is disposed to cover at least a partial region of the director member 911. In addition, the shield layer 916 may be disposed as a structure that covers the entire director member 911. In addition, the shield layer 916 may be provided on the director member 911 and disposed over at least a partial region of the dielectric layer 914 adjacent to the director member 911. In addition, the shield layer 916 may be disposed on the director member 911, the dielectric layer 914, and the plating layer 917. The shield layer 916 is provided to have insulation properties. The shield layer 916 may include an insulating material. The insulating material may include thermosetting resin, such as epoxy resin, or thermoplastic resin such as polyimide. In addition, the insulating material may include a reinforcing material such as an inorganic filler. For example, the reinforcing material may be ABF or the like. In addition, the shield layer 916 may be made of a photo imageable encapsulant (PIE), an epoxy molding compound (EMC), or the like.

The antenna 910 may be disposed on one surface of the wiring structure 920. A lower surface of the antenna 910 faces one surface of the wiring structure 920. Hereinafter, one surface of the wiring structure 920 is referred to as an upper surface of the wiring structure 920. The wiring structure 920 may include an insulation layer and a wiring layer. The wiring structure 920 may have a structure similar to a copper redistribution layer (RDL) of a printed circuit board (PCB).

The wiring layer may be electrically connected to the antenna pattern 912 through the through-via 913 and provide a route for the RF signal. In addition, the wiring layer may provide a ground region and a power region. In addition, the wiring layer may provide an electrical path between a core member 940 and an IC 930.

The IC 930, connection terminals 931, passive elements 935, and the core member 940 may be disposed on the lower surface of the wiring structure 920.

The IC 930 may generate the RF signal. In addition, the IC 930 may receive the RF signal received by the antenna pattern 912. The IC 930 may receive a base signal through the core member 940 and perform at least some conversions of frequencies of the base signal, amplification, filtering phase control, and power generation, thereby generating RF signals with a millimeter-wave (mmWave) band (e.g., 28 GHz or 60 GHz).

The connection terminal 931 electrically connects the IC 930 and a wiring layer 932. The connection terminal 931 may electrically connect the core member 940 and the wiring layer 932. The connection terminal 931 may be encapsulated with an encapsulation material for improving arrangement stability of the IC 930. The connection terminal 931 may be an electrode, a pin, a solder ball, a land, or the like.

The passive element 935 may provide at least one of a resistance value, capacitance, and inductance may be provided to the IC 930. The passive element 935 may include a multilayer ceramic capacitor (MLCC).

The core member 940 may receive a base signal, power, or the like. The core member 940 may transmit a low-frequency signal, power, and the like to the IC 930. The core member 940 may be electrically connected to the wiring layer by means of the connection terminal 931.

The directionality adjustment pattern 960 is disposed on one surface of the antenna 910. The directionality adjustment pattern 960 is disposed in a direction in which the RF signal emitted from the antenna pattern 912 propagates. The directionality adjustment pattern 960 may be disposed to face the director member 911 in the thickness direction of the antenna 910. The directionality adjustment pattern 960 may be disposed to face the antenna pattern 912 in the thickness direction of the antenna 910. The director member 911 may be disposed between the directionality adjustment pattern 960 and the antenna pattern 912. The shield layer 916 may be disposed between the directionality adjustment pattern 960 and the director member 911. The shield layer 916 may be disposed between the directionality adjustment pattern 960 and the antenna pattern 912. The directionality adjustment pattern 960 may be disposed to face the director member 911 with the shield layer 916 interposed therebetween. The directionality adjustment pattern 960 may be disposed to face the antenna pattern 912 with the shield layer 916 interposed therebetween. The directionality adjustment pattern 960 may be disposed on the shield layer 916. The directionality adjustment pattern 960 may be made of a metallic material. The directionality adjustment pattern 960 adjusts directionality and directions of beams generated by the RF signal emitted from the antenna pattern 912. The directionality adjustment pattern 960 provides regions having different heights in an upward/downward direction. A height, in the upward/downward direction, of the region of the directionality adjustment pattern 960, which is provided to improve the directionality of the beams emitted from the antenna pattern 912, is larger than a height of each of the remaining regions in the upward/downward direction.

In addition, the director member 911 may be disposed to be embedded with the dielectric layer 914. In this case, the shield layer 916 may be excluded. That is, the directionality adjustment pattern 960 may be disposed to face the director member 911 and the antenna pattern 912 with the dielectric layer 914 interposed therebetween and disposed at an upper side of the antenna 910. In this case, the dielectric layer 914 serves as the shield layer 916.

In addition, the shield layer 916 may be excluded in case that the director member 911 is excluded. That is, the directionality adjustment pattern 960 may be disposed to face the antenna pattern 912 with the dielectric layer 914 interposed therebetween and disposed at the upper side of the antenna 910. In this case, the dielectric layer 914 serves as the shield layer 916.

Because the directionality adjustment pattern 960 is identical or similar in structure to the directionality adjustment patterns 180, 181, and 182 described above with reference to FIGS. 1, 2, 9, and 10, a repeated description thereof will be omitted.

In addition, the directionality adjustment pattern 960 may be formed by the method described above with reference to FIGS. 3 to 8, and a repeated description thereof will be omitted.

Figure 13:
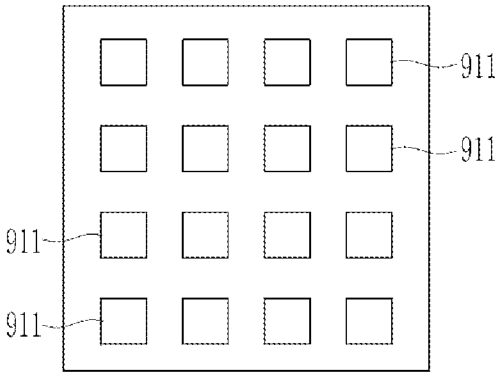
FIG. 13 is a view illustrating an arrangement state of a plurality of director members.

FIG. 13 is a view illustrating an arrangement state of the plurality of director members 911.

With reference to FIG. 13, the plurality of director members 911 may be disposed to be spaced apart from one another on a plane intersecting the thickness direction of the antenna 910. For example, the plurality of director members 911 may be arranged to define a lattice structure. The plurality of director members 911 may have shapes corresponding to one another. The director member 911 may have a quadrangular structure when viewed in the thickness direction of the antenna 910. The antenna pattern 912 may have a shape corresponding to the director member 911. The plurality of antenna patterns 912 may be respectively matched with the director members 911 in a one-to-one manner.

Figure 14:
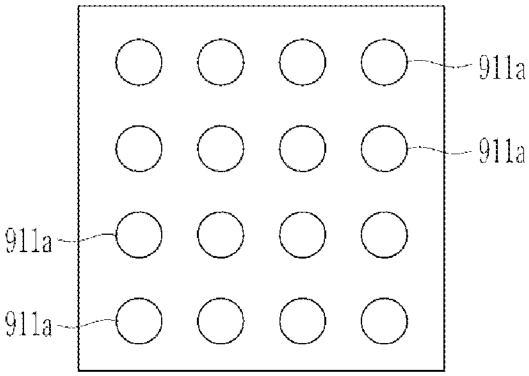
FIG. 14 is a view illustrating an arrangement state of a plurality of director members according to another embodiment.

FIG. 14 is a view illustrating an arrangement state of a plurality of director members 911*a* according to another embodiment.

With reference to FIG. 14, the plurality of director members 911*a* may be disposed to be spaced apart from one another on a plane intersecting the thickness direction of the antenna 910. For example, the plurality of director members 911*a* may be arranged to define a lattice structure. The plurality of director members 911*a* may have shapes corresponding to one another. The director member 911*a* may have a circular structure when viewed in the thickness direction of the antenna 910. The antenna pattern 912 may have a shape corresponding to the director member 911*s*. The plurality of antenna patterns 912 may be respectively matched with the director members 911*a* in a one-to-one manner.

As illustrated in FIGS. 13 and 14, the structure of the director member 911 or 911*a*, which is defined when viewed in the thickness direction of the antenna 910, may be adjusted to a quadrangular shape, a circular shape, an elliptical shape, or other polygonal shapes. Therefore, the property factors of the antenna 910, such as a gain of the antenna 910, a half power beam width (HPBW), a bandwidth, and input impedance, may be adjusted.

Although the embodiments of the present disclosure have been described in detail above, the right scope of the present disclosure is not limited thereto, and it should be construed that many variations and modifications made by those skilled in the art using the basic concept of the present disclosure, which is defined in the following claims, will also belong to the right scope of the present disclosure.

What is claimed is:

1. An antenna substrate comprising:

an antenna including an antenna pattern configured to transmit or receive an RF signal;

a shield layer disposed on the antenna pattern; and a directionality adjustment pattern including a plurality of metal layers having a preset area and disposed to be spaced apart from one another, the directionality adjustment pattern protruding from an upper surface of the shield layer and being disposed on one surface of the antenna, and with respect to the upper surface of the shield layer, at least one of the plurality of metal layers has a larger height than each of the remaining metal layers.

2. The antenna substrate of claim 1, wherein:

the directionality adjustment pattern is disposed to face the antenna pattern in a thickness direction of the antenna.

3. The antenna substrate of claim 1, further comprising:

a wiring structure having one surface on which the antenna is disposed, wherein the antenna is a chip-type antenna.

4. The antenna substrate of claim 3, further comprising:

an encapsulation material disposed on the one surface of the wiring structure and configured to surround at least a part of the antenna.

5. The antenna substrate of claim 4, wherein the shield layer has insulation properties and is disposed between the directionality adjustment pattern and the antenna pattern.

6. The antenna substrate of claim 5, wherein:

the shield layer is disposed to cover at least a partial region of the antenna pattern.

7. The antenna substrate of claim 5, wherein:

the shield layer is provided on the antenna pattern and disposed on at least a partial region of the encapsulation material adjacent to the antenna pattern.

8. The antenna substrate of claim 1, further comprising:

a wiring structure having one surface on which the antenna is disposed, wherein the antenna further comprises:

a dielectric layer configured to surround the antenna pattern; and a through-via connected to the antenna pattern, penetrating through the dielectric layer, and extending in a direction in which the wiring structure is disposed.

9. The antenna substrate of claim 8, wherein:

the antenna further comprises a director member disposed between the directionality adjustment pattern and the antenna pattern.

10. The antenna substrate of claim 9, wherein the shield layer has insulation properties and is disposed between the directionality adjustment pattern and the director member.

11. The antenna substrate of claim 10, wherein:

the shield layer is disposed to cover at least a partial region of the director member.

12. The antenna substrate of claim 10, wherein:

the shield layer is provided on the director member and disposed on at least a partial region of the dielectric layer adjacent to the director member.

13. The antenna substrate of claim 8, wherein:

the antenna pattern is provided as a plurality of antenna patterns disposed to be spaced apart from one another on a plane intersecting a thickness direction of the antenna.

14. The antenna substrate of claim 1, wherein:

the directionality adjustment pattern is provided as a metamaterial structure.

15. The antenna substrate of claim 1, wherein:

the RF signal emitted from the antenna pattern is configured to propagate through the directionality adjustment pattern.

16. The antenna substrate of claim 1, wherein:

a height of the plurality of metal layers increases from an edge region of the directionality adjustment pattern to a center region of the directionality adjustment pattern.

17. An antenna substrate comprising:

an antenna including an antenna pattern configured to transmit or receive an RF signal;

a shield layer disposed on the antenna pattern; and a directionality adjustment pattern including a plurality of metal layers having a preset area and disposed to be spaced apart from one another, the directionality adjustment pattern protruding from an upper surface of the shield layer and being disposed on one surface of the antenna, wherein the directionality adjustment pattern comprises:

a first pattern region disposed at a first distance from a central region of the directionality adjustment pattern; and a second pattern region disposed at a second distance, which is longer than the first distance, from the central region of the directionality adjustment pattern, and wherein with respect to the upper surface of the shield layer, one of the first and second pattern regions has a larger height than another of the first and second pattern regions.

18. The antenna substrate of claim 17, wherein:

the plurality of metal layers of the first pattern region have different heights in an upward/downward direction.

19. The antenna substrate of claim 17, wherein:

the plurality of metal layers of the second pattern region have different heights in an upward/downward direction.

* * * * *